Figure 1:
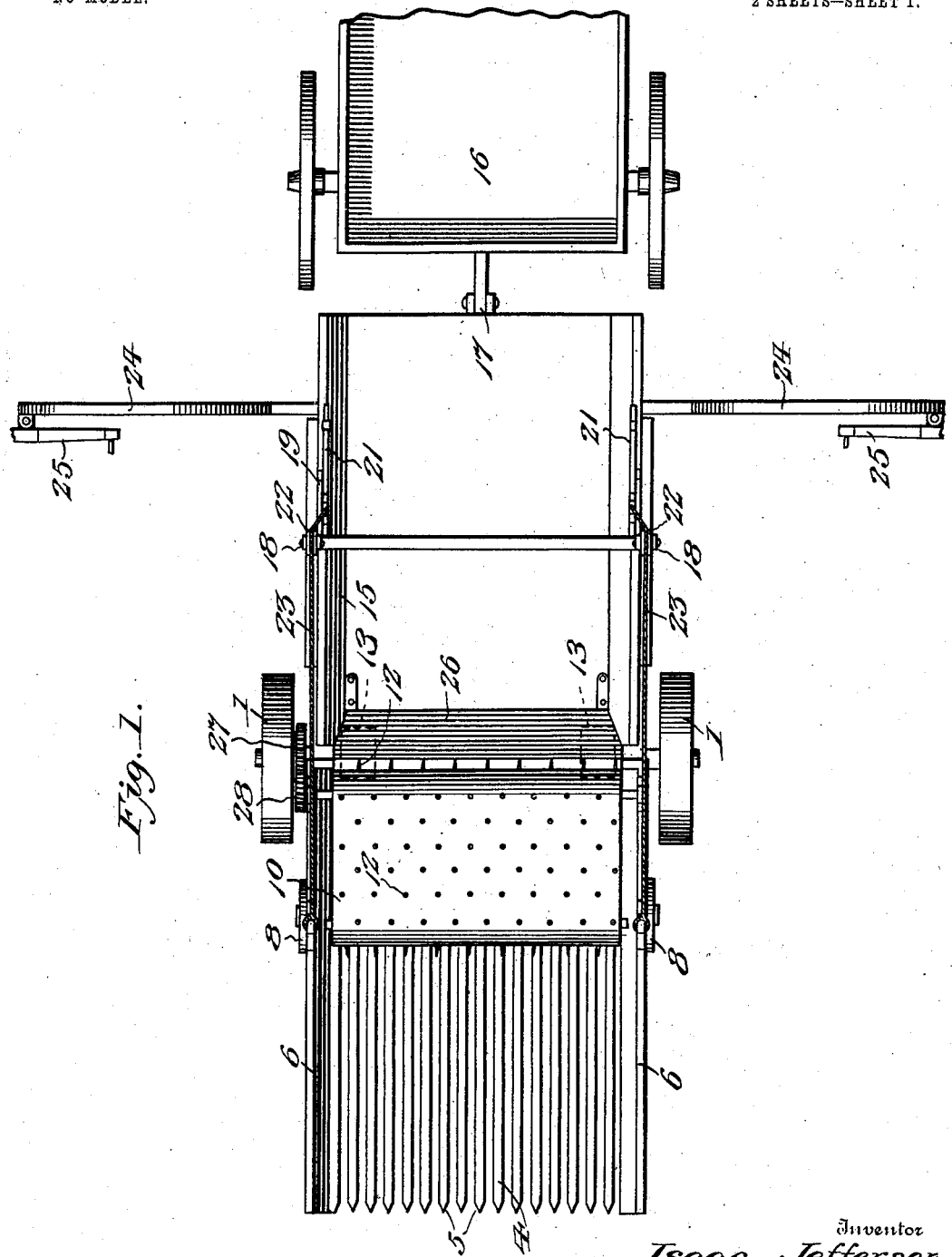

No. 745,190. PATENTED NOV. 24, 1903.
I. JEFFERSON.
COTTON HARVESTER.
APPLICATION FILED MAY 6, 1903.
NO MODEL. 2 SHEETS—SHEET 1.

Witnesses
Edwin G. McKee
Herbert D. Lawson

Inventor
Isaac Jefferson
By Victor J. Evans
Attorney

No. 745,190. PATENTED NOV. 24, 1903.
I. JEFFERSON.
COTTON HARVESTER.
APPLICATION FILED MAY 6, 1903.
NO MODEL. 2 SHEETS—SHEET 2.
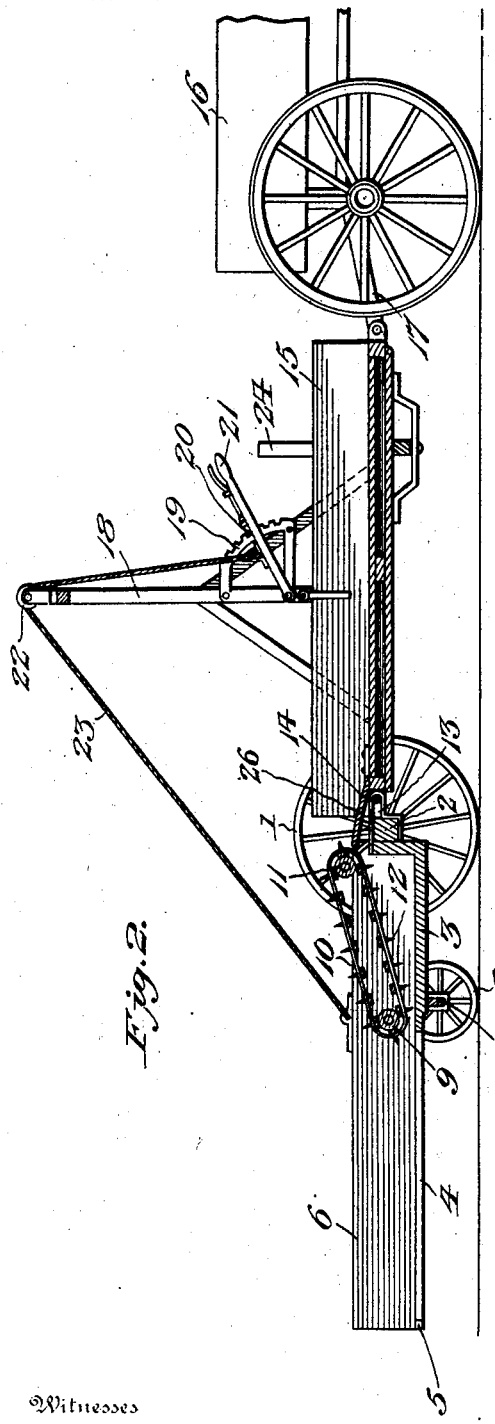
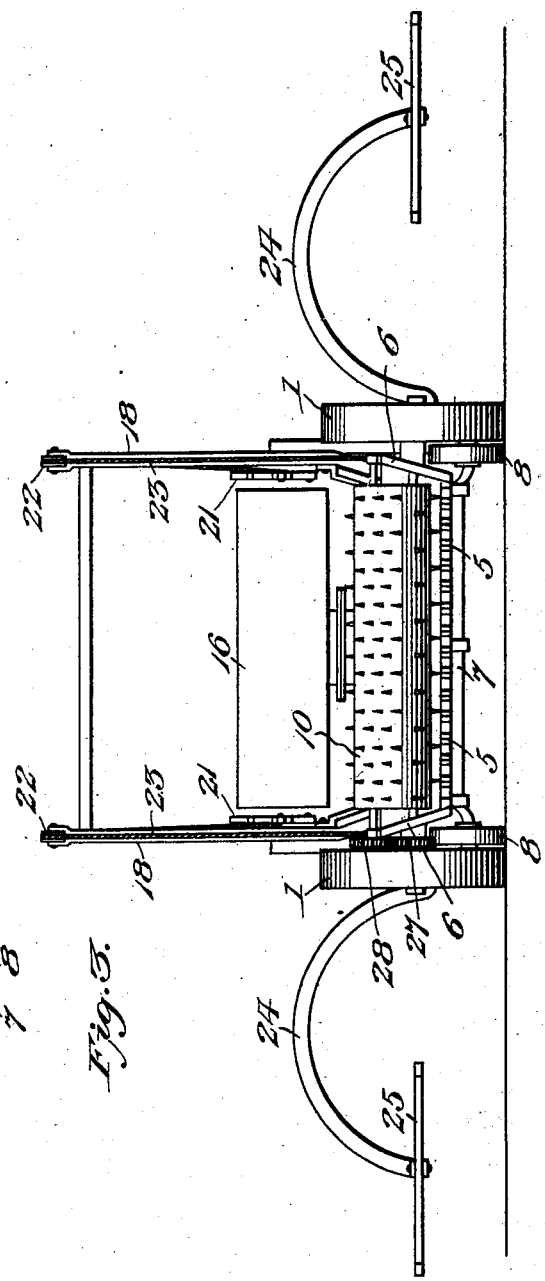
Witnesses
Edwin G. McKee
Herbert D. Lawson
Inventor
Isaac Jefferson
By Victor J. Evans
Attorney No. 745,190. Patented November 24, 1903.

UNITED STATES PATENT OFFICE.

ISAAC JEFFERSON, OF LANGSTON, OKLAHOMA TERRITORY.

COTTON-HARVESTER.

SPECIFICATION forming part of Letters Patent No. 745,190, dated November 24, 1903.

Application filed May 6, 1903. Serial No. 155,903. (No model.)

*To all whom it may concern:*

Be it known that I, ISAAC JEFFERSON, a citizen of the United States, residing at Langston, in the county of Logan and Territory of Oklahoma, have invented new and useful Improvements in Cotton-Harvesters, of which the following is a specification.

My invention relates to new and useful improvements in cotton-harvesters; and its object is to provide a machine of simple construction adapted to be drawn over the rows of cotton and having means whereby the cotton-bolls may be gathered and conveyed to a receptacle provided therefor.

A further object is to provide means whereby the gathering mechanism may be adjusted to plants of different heights.

With the above and other objects in view the invention consists in the novel construction and combination of parts hereinafter more fully described and claimed, and illustrated in the accompanying drawings, showing the preferred form of my invention, and in which—

Figure 1 is a plan view of a cotton-harvester constructed in accordance with my invention. Fig. 2 is a central longitudinal section therethrough, and Fig. 3 is a front elevation.

Referring to the figures by numerals of reference, 1 1 are traction-wheels, upon the axle 2 of which is secured the rear end of a frame 3, having parallel fingers 4 projecting forward from its front edge and provided with sharpened ends 5. The side boards 6 of frame 3 project longitudinally of the fingers 4, and their outer ends are in alinement with the ends 5 of the fingers. The forward end of the frame 3 is supported upon the axle 7 of small traction-wheels 8. Adjacent to and directly above the forward ends of frame 3 is journaled a shaft 9, having an apron 10 arranged thereon and extending over a second shaft 11, journaled upon the side boards 6 of frame 3, at the rear end thereof. The apron is thus held in an inclined position. Teeth or prongs 12 extend from the outer face of the apron for the purpose hereinafter more fully described. A bracket 13 extends rearwardly from the axle 2, and journaled therein is a rod 14, which extends transversely of the forward end of a receptacle 15. The rear end of this receptacle is adapted to be connected to a wagon 16 by means of a link connection 17, and this link also serves to support the rear end of the receptacle 15, so that said receptacle will remain in a substantially horizontal position. Standards 18 extend upward from the sides of receptacle 15, and each has a toothed segment 19 thereon, adapted to be engaged by the pawl 20 of a lever 21, fulcrumed upon the standard. A pulley 22 is journaled in the upper end of the standard, and extending over this pulley is a cable 23, one end of which is secured to a side board 6 of the frame 3, while the other end is connected to lever 21 at a point between the ends thereof. A bow-shaped arm 24 is secured to each side of receptacle 15, and to the outer end thereof is secured a whiffletree 25, to which the draft-animals may be secured, and an inclined board 26 extends from the forward end of the bottom of receptacle 15 to a point adjacent to the upper end of the apron 11.

When the machine herein described is drawn forward, motion is transmitted from one of the traction-wheels 1 to the shaft 11 by means of a gear 27, which is secured to said wheel and meshes with a gear 28, secured to the shaft 11. This rotation of shaft 11 will draw the upper portion of the apron 10 upward. During the forward movement of the machine the cotton-plants will be engaged by the fingers 4, and they will draw the bolls from the stalks, and these bolls will be grasped by the teeth 12 on apron 10 and carried upward to the inclined board 26, upon which they will be deposited. This board will guide them into receptacle 15, where they are taken by the operator and placed within the wagon 16, in rear thereof. By drawing the levers 21 downward or throwing them upward the frame 3 can be raised or lowered, as desired, so as to bring the fingers 4 at a desired level in order to accommodate them to plants of different sizes. The arms 24 are of such length as to bring the whiffletrees 25 in position between the rows of cotton at the sides of the row operated upon by the machine, and as these arms are bow-shaped it will be understood that they will pass over the rows of plants without injuring them.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a cotton-harvester, the combination with traction-wheels having a frame supported thereby; of plant-engaging fingers extending from one end of the frame, a shaft journaled upon the frame, a conveyer-apron mounted upon and adapted to be operated by the shaft, teeth upon the apron, means for transmitting motion from one of the wheels to the apron, a vehicle, a receptacle hinged to the frame and connected to the vehicle, a standard thereon, and an adjusting-cable mounted upon the standard and connected to the frame, whereby said frame may be adjusted.

2. In a cotton-harvester, the combination with traction-wheels, and a frame supported thereby; of plant-engaging fingers extending from one end of the frame, shafts journaled upon the frame, a conveyer-apron upon the shafts, teeth upon the apron, means for transmitting rotary motion from one of the wheels to the apron, a vehicle, a receptacle hinged to the frame and connected to the vehicle, laterally-extending arms to said receptacle, standards upon the receptacle, cables mounted upon the standards and connected to the frame, and means upon the standards for operating said cables to raise or lower the frame.

3. In a cotton-harvester, the combination with traction-wheels having a frame supported thereby; of plant-engaging fingers extending from one end of the frame, a conveyer, means for transmitting motion thereto from one of the traction-wheels, a vehicle, a receptacle hinged to the frame and connected to the vehicle, and means for adjusting the frame in relation to the receptacle.

In testimony whereof I affix my signature in presence of two witnesses.

ISAAC JEFFERSON.

Witnesses:
J. W. WALKER,
H. CALLARK.